(12) United States Patent
Zhang et al.

(10) Patent No.: US 12,287,933 B2
(45) Date of Patent: Apr. 29, 2025

(54) METHOD AND APPARATUS FOR PROCESSING TOUCH EVENT THROUGH DIFFERENT RECEIVING LAYERS, STORAGE MEDIUM AND ELECTRONIC DEVICE

(71) Applicant: BOE Technology Group Co., Ltd., Beijing (CN)

(72) Inventors: Jizhe Zhang, Beijing (CN); Yonggui Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/294,160

(22) PCT Filed: Mar. 31, 2022

(86) PCT No.: PCT/CN2022/084288
§ 371 (c)(1),
(2) Date: Feb. 1, 2024

(87) PCT Pub. No.: WO2023/184301
PCT Pub. Date: Oct. 5, 2023

(65) Prior Publication Data
US 2024/0345677 A1   Oct. 17, 2024

(51) Int. Cl.
*G06F 3/041* (2006.01)
*G06F 3/048* (2013.01)
*G06F 3/04883* (2022.01)

(52) U.S. Cl.
CPC ...... *G06F 3/04166* (2019.05); *G06F 3/04883* (2013.01); *G06F 2203/04104* (2013.01)

(58) Field of Classification Search
CPC ............. G06F 3/04166; G06F 3/04883; G06F 2203/04104
See application file for complete search history.

(56) References Cited

U.S. PATENT DOCUMENTS

| | | | |
|---|---|---|---|
| 8,954,638 B2 | 2/2015 | Davidson | |
| 2011/0298724 A1* | 12/2011 | Ameling | G06F 3/04883 345/173 |
| 2012/0297341 A1* | 11/2012 | Glazer | G06F 9/45504 715/764 |

(Continued)

FOREIGN PATENT DOCUMENTS

| | | |
|---|---|---|
| CN | 102662725 A | 9/2012 |
| CN | 102662725 B | 1/2015 |

(Continued)

OTHER PUBLICATIONS

International Search Report and Written Opinion mailed on Aug. 10, 2022, in corresponding PCT/CN2022/084288, 12 pages.

(Continued)

*Primary Examiner* — Afroza Chowdhury
(74) *Attorney, Agent, or Firm* — XSENSUS LLP

(57) ABSTRACT

A touch event processing method includes: obtaining a screen touch event by means of an event receiving layer, uploading the screen touch event to a JVM by means of an intermediate layer, and assigning and adapting the screen touch event by means of the JVM to obtain an event to be processed, and distributing same to a service processing module for processing.

18 Claims, 7 Drawing Sheets

(56) References Cited

U.S. PATENT DOCUMENTS

2013/0179403 A1* 7/2013 Kim .................... G06F 11/1458
707/654
2014/0104190 A1 4/2014 Davidson
2020/0398110 A1* 12/2020 Kosowsky ............. A63B 69/36

FOREIGN PATENT DOCUMENTS

| CN | 105487705 | A | 4/2016 |
| CN | 109388309 | A | 2/2019 |
| CN | 105487705 | B | 8/2019 |
| CN | 112394871 | A | 2/2021 |
| CN | 113655940 | A | 11/2021 |
| CN | 113687898 | A | 11/2021 |
| CN | 114115870 | A | 3/2022 |
| WO | 2017/084470 | A1 | 5/2017 |
| WO | 2022/042162 | A1 | 3/2022 |

OTHER PUBLICATIONS

Meituan, "Getting Flutter up and running on HarmonyOS Systems", https://tech.meituan.com/2021/01/22/flutter-in-harmonyos.html, Jan. 22, 2021, total 22 pages, Retrieved from the Internet:<https://web.archive.org/web/2021 OJ 22223112/https://blog.csdn.net/MeituanTech/article/details/112975700.html>.

\* cited by examiner

METHOD AND APPARATUS FOR PROCESSING TOUCH EVENT THROUGH DIFFERENT RECEIVING LAYERS, STORAGE MEDIUM AND ELECTRONIC DEVICE

CROSS-REFERENCE TO RELATED APPLICATION

This disclosure is the U.S. national phase application of PCT Application No. PCT/CN2022/084288, filed Mar. 31, 2022 and titled "TOUCH EVENT PROCESSING METHOD AND APPARATUS, STORAGE MEDIUM AND ELECTRONIC DEVICE", the entire content of which is incorporated herein by reference.

TECHNICAL FIELD

Embodiments of this disclosure relate to the field of computer technology, and specifically, to a touch event processing method, a touch event processing device, a computer-readable storage medium, and an electronic device.

BACKGROUND

In the existing touch event processing method, it is impossible to realize the sharing of touch events between the event receiving layer and the Java side.

SUMMARY

According to an aspect of this disclosure, a touch event processing method is provided and configured on a display terminal including an event receiving layer, a Java Virtual Machine (JVM), and an intermediate layer for establishing a communication link between the event receiving layer and the JVM, where the touch event processing method includes:
  obtaining a screen touch event through the event receiving layer;
  uploading the screen touch event to the JVM through the intermediate layer; and
  deriving a to-be-processed event by performing, through the JVM, assignment and adaptation on the screen touch event, and distributing the to-be-processed event to a service processing module for processing.

In some exemplary embodiments of this disclosure, the screen touch event includes at least one of a first touch event input through multiple fingers, a second touch event input through a single finger, and a third touch event input through an external device.

In some exemplary embodiments of this disclosure, when the screen touch event is the first touch event and/or the second touch event, the event receiving layer is a preset touch event processing library; when the screen touch event is the second touch event and/or the third touch event, the event receiving layer is a Dalvik Virtual Machine (DVM).

In some exemplary embodiments of this disclosure, the DVM is Flutter UI.

In some exemplary embodiments of this disclosure, the preset touch event processing library is TsLib.

In some exemplary embodiments of this disclosure, when the screen touch event is the first touch event input through multiple fingers, the touch event processing method, after obtaining the screen touch event, further includes:
  acquiring an event object structure by performing, through the preset touch event processing library, encapsulation on the first touch event.

In some exemplary embodiments of this disclosure, acquiring the event object structure by performing the encapsulation on the first touch event includes:
  acquiring touch event structure data by performing a first encapsulation on a first event type and a first touch parameter included in the first touch event; and
  acquiring the event object structure by performing a second encapsulation on the touch event structure data.

In some exemplary embodiments of this disclosure, the touch event processing method, after acquiring the event object structure, further includes:
  acquiring an event object array by placing, at a first preset time interval, all event object structures within the first preset time interval into a single array;
  where uploading the screen touch event to the JVM through the intermediate layer includes:
  uploading the object array to the JVM through the intermediate layer.

In some exemplary embodiments of this disclosure, deriving the to-be-processed event by performing the assignment and adaptation on the screen touch event includes:
  creating a first initial movement event object, traversing each event object structure in the event object array, and acquiring a first target movement event object by performing assignment on the first initial movement event object using the first event type and the first touch parameter included in the event object structure; and
  deriving a first to-be-processed event by performing, on the first target movement event object, universal interface adaptation corresponding to the JVM.

In some exemplary embodiments of this disclosure, deriving the first to-be-processed event by performing, on the first target movement event object, the universal interface adaptation corresponding to the JVM includes:
  determining whether the first event type of the first target movement event object is a first preset type, where the first preset type refers to touching a screen by a first finger for a first time;
  acquiring, if the first event type is the first preset type, a first valid number of fingers according to a first event subscript value included in the first target movement event object;
  performing, when determining that the first valid number of fingers is greater than a first preset threshold, reassignment on the first event type based on a preset assignment rule, the first event subscript value and a second preset type, where the second preset type refers to presence of another finger on the screen before a current finger is pressed; and
  deriving the first to-be-processed event by placing the first target movement event object subject to the reassignment in a preset event queue.

In some exemplary embodiments of this disclosure, the touch event processing method further includes:
  calculating, if the first event type is a third preset type, a second valid number of fingers based on an original number of valid touch points, where the third preset type refers to leaving the screen by one last finger;
  deriving, when determining that the second valid number of fingers is greater than a second preset threshold, the first to-be-processed event by performing reassignment on the first event type based on the preset assignment rule, the first event subscript value and a fourth preset type, where the fourth preset type refers to presence of another finger on the screen before a current finger is lifted.

In some exemplary embodiments of this disclosure, the touch event processing further includes:

deriving, if the first event type is not the first preset type and is a fifth preset type, the first to-be-processed event by placing all first target movement event objects whose first event type is the fifth preset type in the preset event queue.

In some exemplary embodiments of this disclosure, after distributing the to-be-processed event to the service processing module for processing, the touch event processing method further includes:

receiving, through the JVM, a first processed event sent after the service processing module completes processing of the first to-be-processed event, and determining whether a second event type of the first processed event is a third preset type or a fourth preset type;

updating, if the second event type is the third preset type or the fourth preset type, a second event subscript value and an event action included in the preset event queue;

determining whether updated second event subscript value is greater than a third event subscript value of the first processed event; and when determining that the updated second event subscript value is greater than the third event subscript value, performing reassignment on the second event subscript value and the event action, and removing the first to-be-processed event corresponding to the first processed event from the preset event queue.

In some exemplary embodiments of this disclosure, when the screen touch event is a second touch event and/or a third touch event, after obtaining the screen touch event, the touch event processing method further includes:

acquiring second encapsulated data and/or third encapsulated data by invoking a preset encapsulation function to encapsulate the second touch event and/or the third touch event;

where, uploading the screen touch event to the JVM through the intermediate layer includes:

uploading the second encapsulated data and/or the third encapsulated data to the JVM through the intermediate layer.

In some exemplary embodiments of this disclosure, deriving the to-be-processed event by performing the assignment and adaptation on the screen touch event includes:

creating a second initial movement event object, and acquiring a second target movement event object by performing assignment on the second initial movement event object according to a third event type and a second touch parameter included in the second encapsulated data; and deriving a second to-be-processed event by performing, on the second target movement event object, universal interface adaptation corresponding to the JVM.

In some exemplary embodiments of this disclosure, deriving the second to-be-processed event by performing, on the second target movement event object, the universal interface adaptation corresponding to the JVM includes:

determining whether the third event type of the second target movement event object is a first preset type;

acquiring, if the third event type is the first preset type, a third valid number of fingers according to an event ID value included in the second target movement event object; and performing reassignment on the third event type according to the third valid number of fingers, and deriving the second to-be-processed event by placing the second target movement event object subject to the reassignment in a preset event queue.

In some exemplary embodiments of this disclosure, the touch event processing method further includes:

processing the to-be-processed event through the service processing module.

In some exemplary embodiments of this disclosure, when the screen touch event is the first touch event input through multiple fingers, processing the to-be-processed event includes:

determining a gesture type of the to-be-processed event;

determining, if the gesture type is a moving gesture, a movement type of the moving gesture;

acquiring, if the movement type is movement start, a historical drawing time node of a previous drawing event corresponding to a current drawing event included in the to-be-processed event;

calculating, if the movement type is moving, a current movement distance of the current drawing event, and determining whether a time difference between a current time node and the historical drawing time node is greater than a second preset time; drawing, when determining that the time difference is greater than the second preset time, the current drawing event according to the current movement distance; and updating the historical drawing time node according to the current time node;

calculating, if the movement type is end of movement, the current movement distance of the current drawing event, and drawing the current drawing event according to the current movement distance.

According to an aspect of this disclosure, a touch event processing apparatus is provided and configured on a display terminal including an event receiving layer, a JVM, and an intermediate layer for establishing a communication link between the event receiving layer and the JVM, where the touch event processing apparatus includes:

a touch event obtaining module, configured to obtain a screen touch event through the event receiving layer;

a touch event uploading module, configured to upload the screen touch event to the JVM through the intermediate layer, and a touch event adaptation module, configured to derive a to-be-processed event by performing, through the JVM, assignment and adaptation on the screen touch event, and distribute the to-be-processed event to a service processing module for processing.

According to an aspect of this disclosure, a computer-readable storage medium is provided and used for storing a computer program thereon, where the computer program is configured to, upon being executed by a processor, implement the touch event processing method according to any embodiment as described above.

According to an aspect of this disclosure, an electronic device is provided and includes:

a processor, and a memory for storing executable instructions of the processor;

where, the processor is configured to, through executing the executable instructions, implement the touch event processing method according to any embodiment as described above.

It should be understood that the foregoing general description and the following detailed description are exemplary and explanatory only, and do not limit this disclosure.

BRIEF DESCRIPTION OF THE DRAWINGS

The accompanying drawings, which are incorporated in and constitute a part of this specification, illustrate embodiments consistent with the disclosure and together with the description, serve to explain the principles of the disclosure. Obviously, the drawings in the following description are only some embodiments of this disclosure. For those of ordinary skill in the art, other drawings can be obtained based on these drawings without exerting creative efforts. In the accompanying drawings.

DETAILED DESCRIPTION

Figure 1:
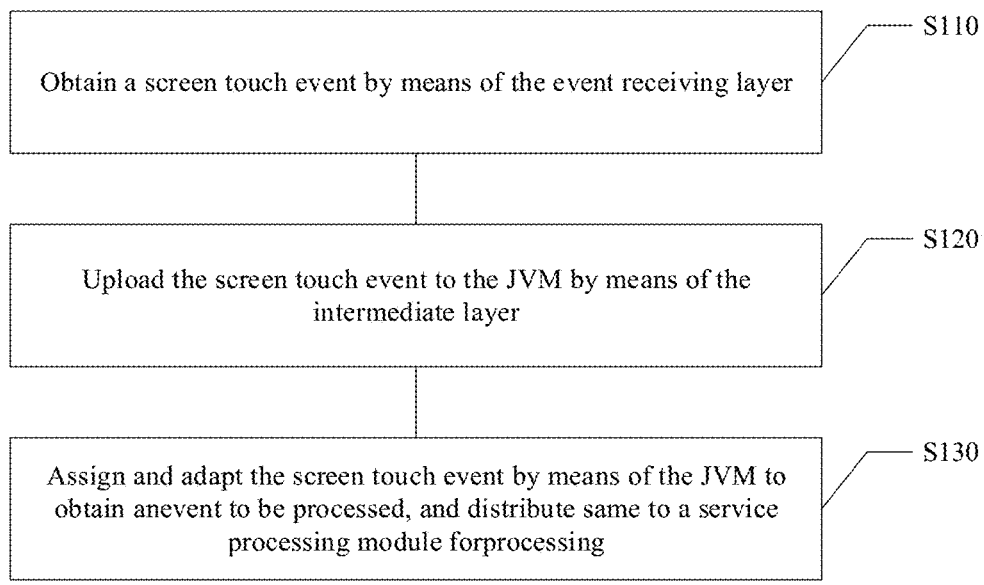
FIG. 1 schematically illustrates a flow chart of a touch event processing method according to some exemplary embodiments of this disclosure.

Exemplary embodiments will now be described more fully with reference to the accompanying drawings. Exemplary embodiments may, however, be embodied in various forms and should not be construed as limited to the examples set forth herein. Rather, these embodiments are provided so that this disclosure will be thorough and complete, and will fully convey the concepts of the exemplary embodiments to those skilled in the art. The described features, structures or characteristics may be combined in any suitable manner in one or more embodiments.

Furthermore, the drawings are merely schematic illustrations of this disclosure and are not necessarily drawn to scale. The same reference numerals in the drawings represent the same or similar parts, and thus their repeated description will be omitted. Some of the block diagrams shown in the drawings are functional entities and do not necessarily correspond to physically or logically separate entities. These functional entities may be implemented in software form, or implemented in one or more hardware modules or integrated circuits, or implemented in different networks and/or processor devices and/or microcontroller devices.

Exemplary embodiments of this disclosure first provide a touch event processing method, which can be run on a display terminal, or on a server, server cluster, cloud server, and the like. Alternatively, those skilled in the art can also achieve the method of the present invention on other platforms according to needs, which are not particularly limited in the exemplary embodiments. Referring to FIG. 1, the touch event processing method may include the following steps.

In step S110, a screen touch event is obtained through an event receiving layer.

In step S120, the screen touch event is uploaded to JVM through an intermediate layer.

In step S130, a to-be-processed event is derived by performing, through the JVM, assignment and adaptation on the screen touch event, and the to-be-processed event is distributed to a service processing module for processing.

In the above touch event processing method, on the one hand, the screen touch event can be obtained through the event receiving layer; then the screen touch event can be uploaded to the JVM through the intermediate layer; finally, assignment and adaptation can be performed on the screen touch event through the JVM to obtain the to-be-processed event, which is distributed to the service processing module for processing, thereby realizing the sharing of touch events between the event receiving layer and the Java side. In other words, when the touch event is received through the event receiving layer, the touch event received by the event receiving layer can be processed through the Java side, thereby improving the reception efficiency of touch events and improving the processing efficiency of touch events. On the other hand, since the screen touch event received by the event receiving layer can be uploaded to the Java side through the intermediate layer, the Java side is enabled to reuse the code logic of the event receiving layer, thereby improving the accuracy of the touch event processing results and improving the user experience.

Hereinafter, the touch event processing method according to some exemplary embodiments of this disclosure will be explained and described in detail with reference to the accompanying drawings.

First, the application scenarios and the purpose of the invention are explained and described in the exemplary embodiments of this disclosure. Specifically, the touch event processing method according to some exemplary embodiments of this disclosure relates to the message communication and dispatching technology of the Linux operating system, and specifically relates to the screen multi-touch solution of the Linux operating system Herein the Linux operating system may be implemented based on the KirinIM system or other systems, which are not limited in this example. At the same time, the touch event processing method provided in this application effectively targets and solves the problems that the existing Flutter (a mobile UI framework that helps developers efficiently build multi-platform exquisite applications through a set of code libraries, supporting various platforms including mobile, Web, desktop and embedded platform, with strong rendering capabilities and high drawing refresh rates) has no manner and structure adapted to sharing touch instructions on the Java platform, and that the Kirin system (AArch64 architecture) does not support multi-touch and only supports mouse and the single finger touch event.

Also, in order to support the rapid porting of the Android whiteboard application software to the Linux system platform, ensure the high reusability of Java code, and improve the project development speed, an architecture design method is proposed by using event receiving layer (TsLib or Flutter)+intermediate layer (C side)+JVM (Java side). The event receiving layer side is used for UI display. The C side is a communication bridge between the event receiving layer and Java. Java reuses the Android whiteboard code logic to implement specific backend services. In a Linux project that adopts the architecture model of event receiving layer (TsLib or Flutter)+intermediate layer (C side)+JVM (Java side), the existing Flutter has no way adapted to sharing touch instructions on the Java platform.

Secondly, the display terminal involved in some exemplary embodiments of this disclosure is explained and described. Specifically, referring to FIG. 2, the display terminal may include an event receiving layer 210, a JVM (Java) 220, and an intermediate layer (C/C++) 230 that establishes a communication link between the event receiving layer and the JVM. Herein, the event receiving layer may be a DVM (Dalvik Virtual Machine), or a preset touch event processing library. The preset touch event processing library may be, for example, TsLib. In some embodiments, the screen touch event may include a first touch event input through multiple fingers, a second touch event input through a single finger, a third touch event input through an external device and the like. Accordingly, when the screen touch event is the first touch event and/or the second touch event, the event receiving layer is the preset touch event processing library; and when the screen touch event is the second touch event and/or the third touch event, the event receiving layer is the DVM.

Further, the event receiving layer may be configured to display the interactive user interface and obtain the screen touch event that the user acts on the interactive interface. The intermediate layer is configured to upload screen touch event, and the JVM is configured to derive the to-be-processed event by performing assignment and adaptation on the screen touch event, and distribute the to-be-processed event to the service processing module for processing. In a specific application process, by adopting the design scheme of event receiving layer (TsLib or Flutter)+intermediate layer (C side)+JVM (Java side), cross-platform can be realized between the event receiving layer (DVM or TsLib) and Java (JVM), so Java can highly reuse code implementation of Android App, and Flutter and TsLib have strong rendering capabilities and high software performance.

Figure 3:
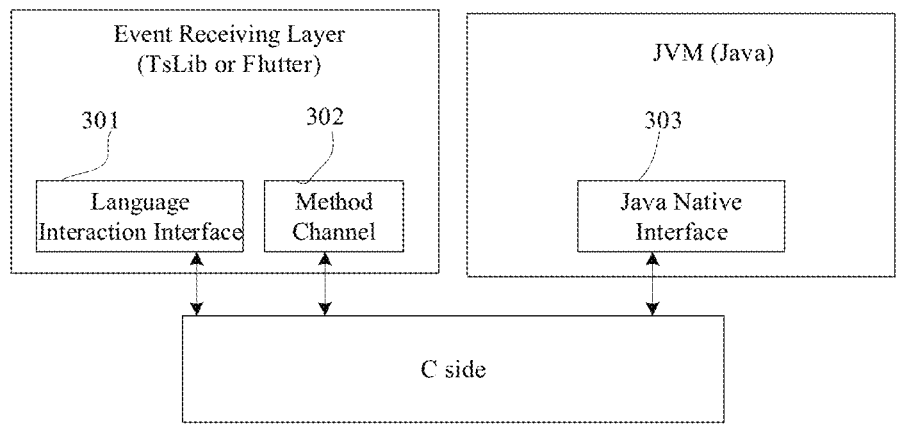
FIG. 3 schematically illustrates an exemplary application scenario of a touch event processing method according to some exemplary embodiments of this disclosure.

Further, as shown in FIG. 3, the UI is displayed through the event receiving layer (TsLib or Flutter), and a communication bridge between the event receiving layer (TsLib or Flutter) and the Java side is established through the C side. At the same time, multi-touch InputEvent event is provided at the TsLib or Flutter side, thereby enabling the Java side to reuse the Android whiteboard code logic to implement specific backend services. Herein, the TsLib or Flutter side communicates with the C side through FFI (Foreign Function Interface, which is a language interaction interface) 301 and MethodChannel 302. Herein, FFI and MethodChannel are interfaces that may be configured to communicate with the underlying layer. The Java side communicates with the C side through JNI (Java Native Interface) 303, which is also an interface used to communicate with the underlying layer.

Figure 2:
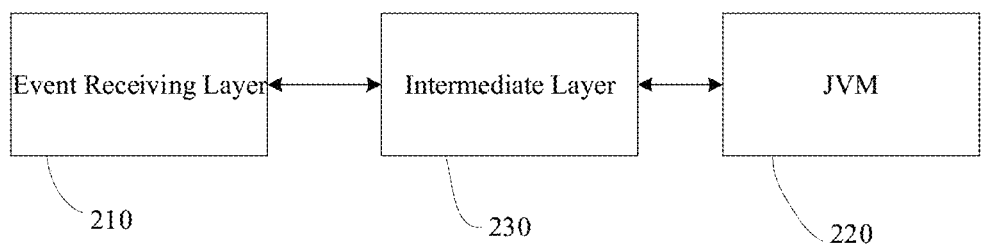
FIG. 2 schematically illustrates an exemplary structural diagram of a display terminal according to some exemplary embodiments of this disclosure.

Hereinafter, the touch event processing method shown in FIG. 1 will be explained and described in detail with reference to FIG. 2 and FIG. 3.

In step S110, the screen touch event is obtained through the event receiving layer.

In this exemplary embodiment, first, in order to obtain the screen touch event, a process may need to be created and started. Specifically, after the process on the Flutter side is started, a dynamic link library is associated with DynamicLibrary open ("xxx-lib.so"), so that the Flutter side can communicate with the C side (intermediate layer). Then, on the C side, the JVM is created by calling dlopen to open jvm.so and execute the JNI_CreateJavaVM method. At the same time, on the Java side, System.loadLibrary is called to introduce a corresponding C-layer interface.so library, thereby achieving the communication between the C side and the Java side through JNI. Further, it is necessary to open the TsLib service through a ts_open function. Until then, the Flutter or TsLib and the Java process are started, and normal data communication can be carried out between the TsLib or Flutter side and the C side, and between the C side and the Java side.

Figure 4:
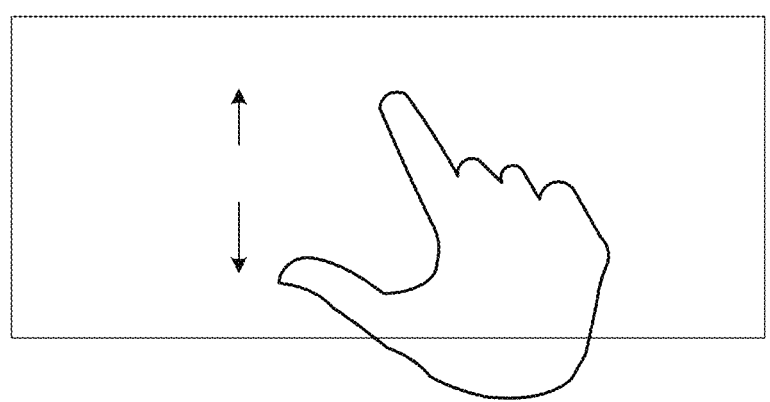
FIG. 4 schematically illustrates an exemplary diagram of a multi-finger input event according to some exemplary embodiments of this disclosure.
Figure 5:
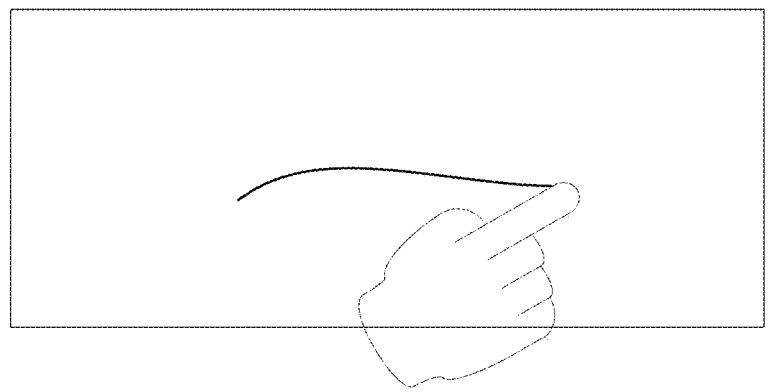
FIG. 5 schematically illustrates an exemplary diagram of a single-finger input event according to some exemplary embodiments of this disclosure.

Then, the screen touch event is obtained. In some embodiments, the screen touch event includes the first touch event input through multiple fingers, the second touch event input through a single finger, the third touch event input through an external device and the like. In other words, the screen touch event may include an event input by the user through multiple fingers on the interactive interface 401 (e.g., FIG. 4), an event input through a single finger (e.g, FIG. 5), and an event input through a mouse. Herein, the event input through multiple fingers may be an event input through multiple actual fingers, or an event input through multiple styluses or capacitive pens, which are not limited in this example. The event input through a single finger may be an event input through a single actual finger, and may also be an event input by a single stylus or capacitive pen, which are not limited in this example. Moreover, when the screen touch event is the first touch event and/or the second touch event, the event receiving layer is the preset touch event processing library TsLib; when the screen touch event is the second touch event and/or the third touch event, the event receiving layer is the DVM (Flutter).

Figure 6:
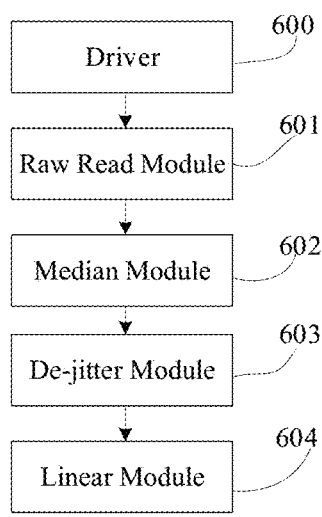
FIG. 6 schematically illustrates an exemplary structural diagram of TsLib according to some exemplary embodiments of this disclosure.

In some embodiments, when the screen touch event is the first touch event input through multi-finger or the second touch event input through single finger, the screen touch event may be obtained in the following manner. Original touch data is obtained and, then, is subjected to de-jitter processing and linearization processing to obtain the screen touch event. In other words, a single-finger input event stream (raw data input by a single finger) or a multi-finger input event stream (raw touch data input by multiple fingers) may be processed based on the TsLib principle to obtain the corresponding screen touch event. In some embodiments, as shown in FIG. 6, processing of the original touch data can be realized in the following manner. First, original touch data is read from a driver 600 by controlling the ts_read_mt ( ) function through the raw read module 601. Then the original touch data is passed to a de-jitter module 603 through a median module 602. Subsequently, the original touch data, after being de-jittered, is linearized by using a linear module 604. Finally, the first touch event and/or the second touch event is output. When all event processing is completed, TsLib can be closed through the ts_close ( ) service.

Furthermore, after obtaining the screen touch event, it may be necessary to encapsulate the screen touch event to obtain encapsulated data. In some embodiments, the screen touch event may be encapsulated in the following two manners.

One manner is that when the screen touch event is the first touch event input through multiple fingers, the encapsulated data can be obtained by encapsulating the screen touch event in the following manner. An event object structure is acquired by performing, through the preset touch event processing library, encapsulation on the first touch event. In some embodiments, acquiring the event object structure by performing, through the preset touch event processing library, the encapsulation on the first touch event may include the following content. First, touch event structure data is acquired by performing a first encapsulation on a first event type and a first touch parameter included in the first touch event. Second, the event object structure is acquired by performing a second encapsulation on the touch event structure data. In some embodiments, after acquiring the first encapsulated data, the touch event processing method further includes: acquiring an event object array by placing, at a first preset time interval, all event object structures within the first preset time interval into a single array; and then, uploading the object array to the JVM through the intermediate layer.

For example, first, a MotionEventObject structure (that is, the event object structure) is defined, which contains touch-related parameters and event type definitions as shown in Table 1 below.

TABLE 1

Touch-related data, event types and their definitions

| Type | Definition |
| --- | --- |
| Action | Classified as: Action_Down, Action_Up, Action_Move |
| PointId | ID value of this event |
| x | Widget relative coordinate point |
| y | Widget relative coordinate point |
| RawX | Full screen absolute coordinate point |
| RawY | Full screen absolute coordinate point |
| pressure | Pressure |
| downTime | Start time of the event |
| Touchmajor | Contact area |
| IToolType | Event type, mouse, touch, etc. |
| eventTime | Event time |

In a specific application process, for the first touch event, touch event structure data is firstly acquired by performing a first encapsulation on the first event type and the first touch parameter included in the first touch event. Then, the first encapsulated data, that is, the event object structure is acquired by performing a second encapsulation on the touch event structure data. Furthermore, an event object array is acquired by placing, at a first preset time interval (e.g., 10 ms, it may be other values, which are not limited in this example), all event object structures within the first preset time interval into a single array. Finally, the object array is uploaded to the C side.

The other manner is to obtain encapsulated data by encapsulating the screen touch event when the screen touch event is the second touch event and/or the third touch event, including the following content. The second encapsulated data and/or the third encapsulated data is acquired by encapsulating the second touch event and/or the third touch event through calling a preset encapsulation function. Then, the second encapsulated data and/or the third encapsulated data are uploaded to JVM through the intermediate layer. For example, since the Flutter side can be used for the display and interaction of UI, Flutter can receive the user's touch command. After receiving the touch command, the encapsulation method of FFI is called for encapsulation, thereby acquiring the corresponding second encapsulated data and/or third encapsulated data.

Finally, after the first encapsulated data and/or the second encapsulated data and/or the third encapsulated data are acquired, they may be uploaded to the C side, that is, the intermediate layer, through the FFI interface.

In step S120, the encapsulated data is uploaded to the JVM through the intermediate layer.

Specifically, after the intermediate layer receives the first encapsulated data and/or the second encapsulated data and/or the third encapsulated data, it can continue to pass the data to the Java side through JNI.

In step S130, the to-be-processed event is derived by performing, through the JVM, assignment and adaptation on the encapsulated data and, then, distributed to the service processing module for processing.

In some exemplary embodiments, the to-be-processed event is firstly derived by performing assignment and adaptation on the encapsulated data. Herein, deriving the to-be-processed event by performing assignment and adaptation on the encapsulated data and includes the following two manners.

First, the MotionEvent structure (initial motion event object) is defined, including touch-related parameters and event type definitions, as shown in Table 1 above and Table 2 below.

TABLE 2

MotionEvent supplementary fields and definitions

| Type | Definition |
| --- | --- |
| ActionIndex | The subscript value of 'Action', which is variable and indicates the pointer (finger) generating the event |
| list | In the same event, there may be information about multiple fingers, all of which are included in this list collection |
| flutterPointerId | PointerId value passed from the Flutter side |

Secondly, in the first manner, when the encapsulated data is an event object array generated based on all event object structures within the first preset time period, since the service logic code on the Java side is transplanted from the native Android version of the App code, it may be necessary to adapt the touch event uploaded by the C side and convert it into an Android standard event interface. In some embodiments, multi-touch related events may be shown in Table 3 below.

TABLE 3

Android multi-touch related event descriptions

| Event | Introduction |
| --- | --- |
| ACTION_DOWN | Triggered when the first finger touches the screen for the first time |
| ACTION_MOVE | Triggered (may be multiple times) when the finger slides on the screen |
| ACTION_ UP | Triggered when the last finger leaves the screen |
| ACTION_POINTER_DOWN | Non-primary finger presses (i.e., there is already a finger on the screen before pressing) |
| ACTION_POINTER_UP | Non-primary finger lifts i.e., there is still finger(s) on the screen after lifting) |

Further, deriving the to-be-processed event by performing the assignment and adaptation on the event object array can be achieved in the following manner. First, a first initial movement event object is created, each event object structure in the event object array is traversed, and a first target movement event object is acquired by performing assignment on the first initial movement event object using the first event type and the first touch parameter included in the event object structure. Second, a first to-be-processed event is derived by performing, on the first target movement event object, universal interface adaptation corresponding to the JVM.

In some embodiments, deriving the first to-be-processed event by performing, on the first target movement event object, the universal interface adaptation corresponding to the JVM can be achieved in the following manner. First, it is determined whether the first event type of the first target movement event object is a first preset type, where the first preset type refers to touching a screen by a first finger for a first time. Second, if the first event type is the first preset type, a first valid number of fingers is acquired according to a first event subscript value included in the first target movement event object. Then, when it is determined that the first valid finger number is greater than the first preset threshold, reassignment is performed on the first event type based on a preset assignment rule, the first event subscript value and a second preset type, where the second preset type refers to presence of another finger on the screen before a current finger is pressed. Finally, the first to-be-processed event is derived by placing the first target movement event object subject to the reassignment in a preset event queue.

Further, if the first event type is a third preset type, a second valid number of fingers is calculated based on an original number of valid touch points, where the third preset type refers to leaving the screen by one last finger. After determining that the second valid number of fingers is greater than the second preset threshold, the first to-be-processed event is derived by performing reassignment on the first event type based on the preset assignment rule, the first event subscript value and a fourth preset type, where the fourth preset type refers to presence of another finger on the screen before a current finger is lifted. At the same time, if the first event type is not the first preset type and is the fifth preset type, the first to-be-processed event is derived by placing all first target movement event objects whose first event type is the fifth preset type in the preset event queue.

Figure 7:
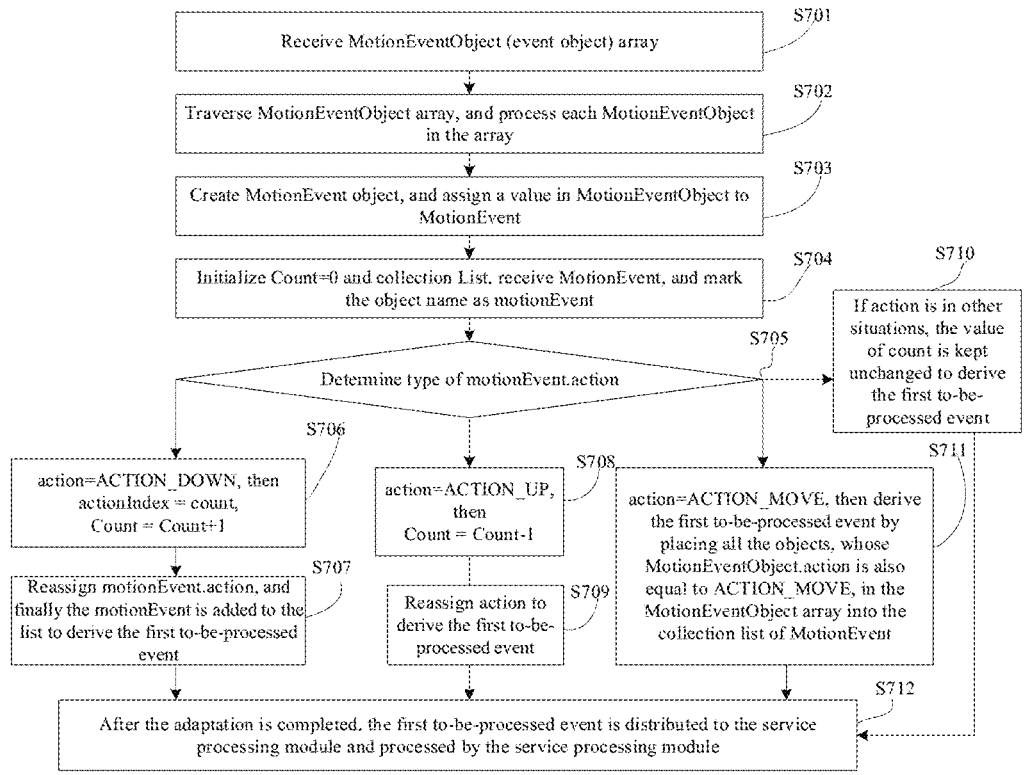
FIG. 7 schematically illustrates a flow chart of a method for assigning and adapting an event object array to obtain a first to-be-processed event according to some exemplary embodiments of this disclosure.

Hereinafter, with reference to FIG. 7, the specific implementation process of how to obtain the first to-be-processed event by performing assignment and adaptation on the event object array will be further explained and illustrated. Specifically, as shown in FIG. 7, the following steps may be included.

In step S701, the MotionEventObject (event object) array is received.

In step S702, the MotionEventObject array is traversed and each MotionEventObject in the array is processed.

In step S703, a MotionEvent object is created and the value in the MotionEventObject is assigned to the MotionEvent.

In step S704, Count-0 and the collection "list" are initialized, and MotionEvent is received, with the object name is marked as motionEvent. Herein, Count is used to mark the actual number of effective touch points currently on the screen, that is, the valid number of fingers; "list" is a collection used to store touch event information for each touch point on the screen.

In step S705, a type of the motionEvent.action is determined.

In step S706, if action is equal to ACTION_DOWN, then actionIndex=count, Count=Count+1.

In step S707, it is determined whether Count is greater than 1. If yes, it means that there are at least two valid touch points on the screen. Accordingly, the motionEvent.action is reassigned through the formula action=actionIndex <<8|ACTION_POINTER_DOWN, and finally the motionEvent is added to the list to derive the first to-be-processed event.

In step S708, if action is equal to ACTION_UP, then Count=Count-1.

In step S709, it is determined whether Count is greater than 0. If yes, it means that there is at least 1 valid touch point on the screen. The action is reassigned through the formula action=actionIndex <<8|ACTION_POINTER_UP to derive the first to-be-processed event.

In step S710, if the action is in other situations, the value of count is kept unchanged to derive the first to-be-processed event In step S711, it is determined whether MotionEvent.action is equal to ACTION_MOVE. If yes, the first to-be-processed event is derived by collectively placing all the objects, whose MotionEventObject.action is also equal to ACTION_MOVE, in the MotionEventObject array into the collection list of MotionEvent.

In step S712, after the adaptation is completed, the first to-be-processed event is distributed to the service processing module and processed by the service processing module.

It is to be noted here that, since the Java side code is transplanted from the source code of the Android version App, it may need to be adapted to the standard Android universal interface, thereby further improving the efficiency of touch events and the accuracy of processing results of touch events.

In the second manner, deriving the to-be-processed event by performing the assignment and adaptation on the encapsulated data can be achieved in the following manner. First, a second initial movement event object is created, and a second target movement event object is acquired by performing assignment on the second initial movement event object according to a third event type and a second touch parameter included in the second encapsulated data. Second, a second to-be-processed event is derived by performing, on the second target movement event object, universal interface adaptation corresponding to the JVM.

In some embodiments, deriving the second to-be-processed event by performing, on the second target movement event object, the universal interface adaptation corresponding to the JVM can be achieved in the following manner. First, it is determined whether the third event type of the second target movement event object is the first preset type and, if the third event type is the first preset type, a third valid number of fingers is acquired according to an event ID value included in the second target movement event object. Second, reassignment is performed on the third event type according to the third valid number of fingers, and the second to-be-processed event is derived by placing the second target movement event object subject to the reassignment in a preset event queue.

Figure 8:
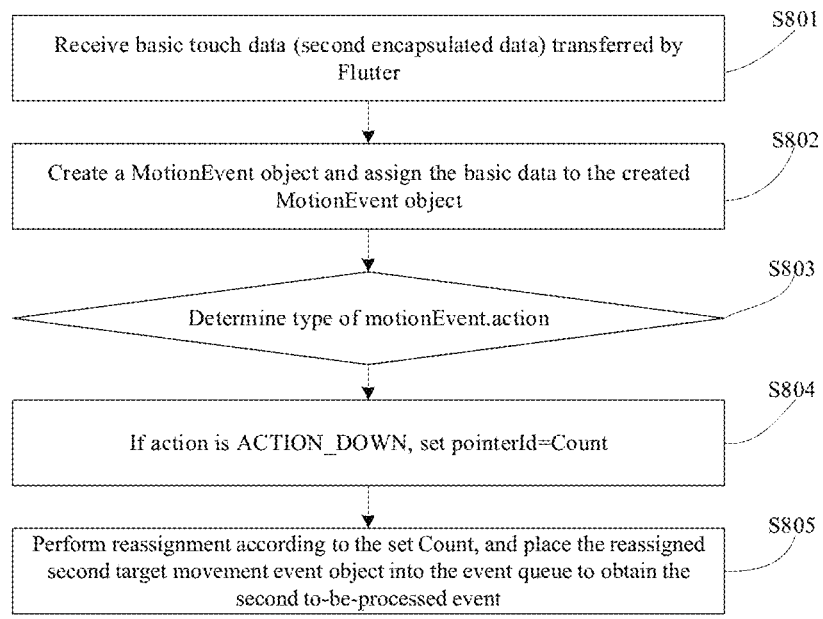
FIG. 8 schematically illustrates a flow chart of a method for assigning and adapting second encapsulated data to obtain a second to-be-processed event according to some exemplary embodiments of this disclosure.

Hereinafter, with reference to FIG. 8, the specific implementation process of how to perform assignment and adaptation on the second encapsulated data to obtain the second to-be-processed event will be further explained and described. Specifically, as shown in FIG. 8, the following steps may be included.

In step S801, basic touch data (second encapsulated data) transferred by Flutter, such as Action, x, y, etc., is received.

In step S802, a MotionEvent object is created and basic data is assigned to the created MotionEvent object.

In step S803, the type of MotionEvent.action is determined.

In step S804, if the action is ACTION_DOWN, pointerId=Count needs to be set. Flutter's event ID is always increasing automatically, but Android's event ID starts counting from 0 every time it starts from the Down event; therefore, the event ID value may need to be calculated and set additionally.

In step S805, reassignment is performed according to the set Count, and the reassigned second target movement event object is placed into the event queue to obtain the second to-be-processed event.

It is to be noted that the specific implementation process of performing assignment and adaptation on the third encapsulated data to obtain the third to-be-processed event is similar to the specific implementation process of the second to-be-processed event, and will not be repeated here. Furthermore, in actual development and application scenarios, TsLib may occupy a separate thread to read and send screen touch data. Therefore, in scenarios that do not require multi-touch, there is no need to activate TsLib, and specific processing of touch control event can be achieved based on the solution described above.

Figure 9:
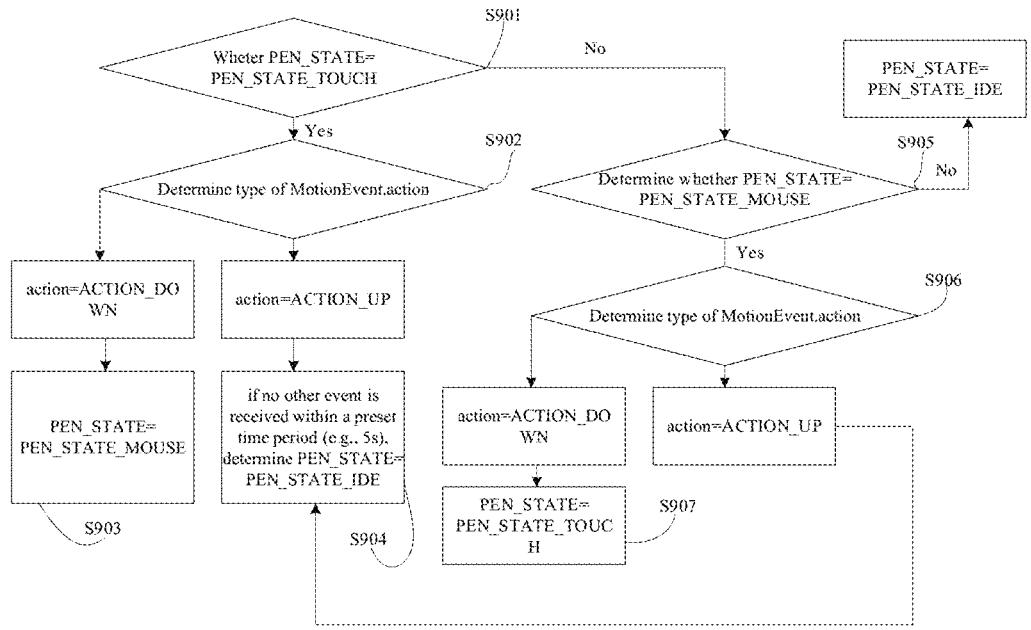
FIG. 9 schematically illustrates a flowchart of a method for determining a touch instruction according to some exemplary embodiments of this disclosure.

It is to be further noted that in the process of receiving screen touch events, when using the mouse to operate, the Java side may only receive the touch data transmitted by Flutter. However, when the screen is touched using a finger(s), both the data transmitted by Flutter and the data transmitted by TsLib can be received. This is because Flutter can receive information input from any type of single-touch device, but in TsLib, TsLib is limited to only receiving finger-type touch events. Therefore, when the screen is touched with finger(s), the competition between TsLib's point reporting and Flutter's point reporting should be processed as, for example, only the events sent by TsLib are received and processed at this time. The specific implementation process may refer to FIG. 9.

Specifically, first, three states are set. State I is idle state: PEN_STATE_IDE. State II refers to a state of writing with the mouse: PEN_STATE_MOUSE. State III refers to a state of touching with the finger: PEN_STATE_TOUCH. Secondly, referring to FIG. 9, the specific method of determining the touch command may include the following steps.

In step S901, it is determined whether PEN_STATE=PEN_STATE_TOUCH; if yes, step S902 is performed; and if not, step S905 is performed.

In step S902, event processing and distribution are performed, and the type of MotionEvent.action is determined; if action=ACTION_DOWN, step S903 is performed; and if action=ACTION_UP, step S904 is performed.

In step S903, PEN_STATE=PEN_STATE_MOUSE.

In step S904, if no other event is received within a preset time period (e.g., 5s), it can be determined that PEN_STATE=PEN_STATE_IDE.

In step S905, it is determined whether PEN_STATE=PEN_STATE_MOUSE; if yes, step S906 is performed; and if not, it is determined that PEN_STATE=PEN_STATE_IDE.

In step S906, event processing and distribution are performed, and the type of MotionEvent.action is determined; if action=ACTION_DOWN, step S907 is performed; and if action=ACTION_UP, step S904 is performed.

In step S907, PEN_STATE=PEN_STATE_TOUCH.

Figure 10:
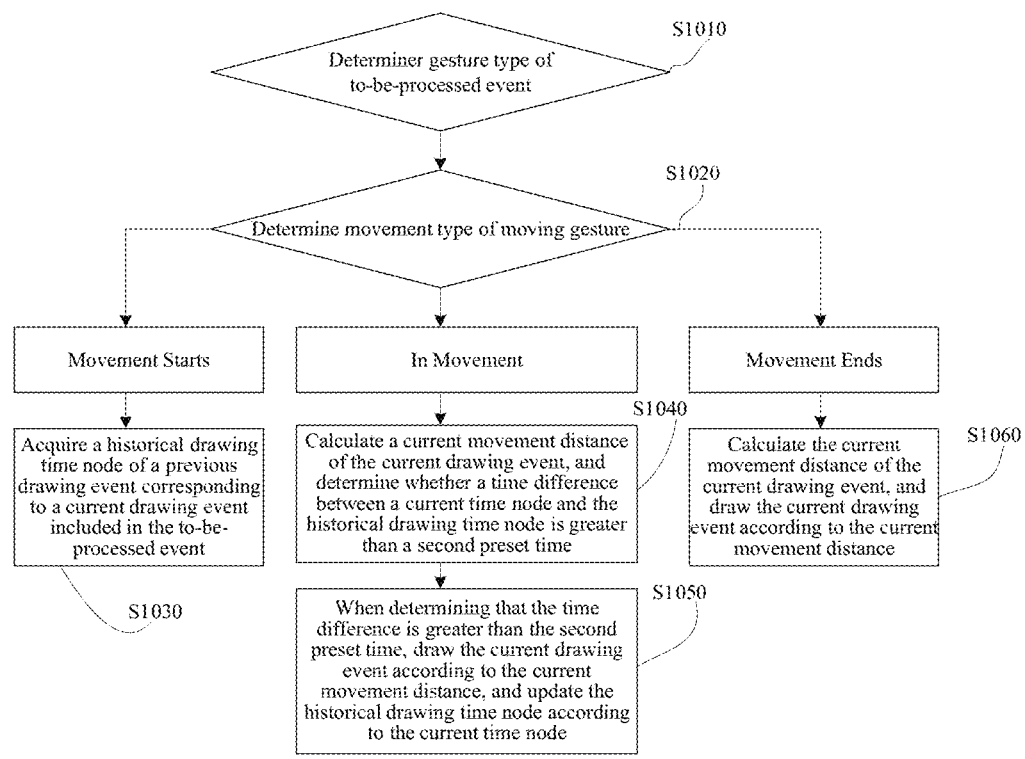
FIG. 10 schematically illustrates a flow chart of a method for processing the to-be-processed event through the service processing module according to some exemplary embodiments of this disclosure.

FIG. 10 schematically illustrates a flow chart of a method for processing the to-be-processed event through the service processing module according to some exemplary embodiments of this disclosure. Specifically, referring to FIG. 10, when the screen touch event is the first touch event input through multiple fingers, the to-be-processed event can be processed in the following manner.

In step S1010, the gesture type of the to-be-processed event is determined.

In step S1020, if the gesture type is a moving gesture, the movement type of the moving gesture is determined.

In step S1030, if the movement type is movement start, a historical drawing time node of a previous drawing event corresponding to a current drawing event included in the to-be-processed event is acquired.

In step S1040, if the movement type is moving, a current movement distance of the current drawing event is calculated, and it is determined whether a time difference between a current time node and the historical drawing time node is greater than a second preset time.

In step S1050, when it is determined that the time difference is greater than the second preset time, the current drawing event is drawn according to the current movement distance, and the historical drawing time node is updated according to the current time node.

In step S1060, if the movement type is movement end, the current movement distance of the current drawing event is calculated, and the current drawing event is drawn according to the current movement distance.

In detail, when a multi-finger gesture is triggered, such as two-finger zooming, multi-finger movement, etc., due to the slow drawing of the system, when TsLib reports a lot of points, it may cause an accumulation of UI drawing events, causing the interface to freeze. Therefore, in this scenario, optimization may be done. Through optimization, excessive drawing operations can be effectively avoided and performance can be improved. In the specific processing, when the service processing module receives the first to-be-processed event, it enters the gesture determination module. If the gesture is a moving gesture, it includes three situations: start of movement, in movement and end of movement. If it is in the start of movement, the parameter lastDrawTime is initialized and the system time of the previous drawing is recorded. If it is in movement, the moving distance is calculated, the current system time is recorded as currentTime, and it is determined whether the difference between currentTime and lastDrawTime is greater than the time required by a single drawing. If the condition is met, drawing is performed. After drawing is completed, last- DrawTime is updated to currentTime. If the movement ends, the movement distance is calculated, and then drawing is performed.

It is to be further noted that in the processing of the to-be-processed event through the service processing module, the specific processing of the multi-finger input event described above is just one example. For the single-finger input event or the event input through the mouse, the service processing module can be configured to perform corresponding display according to specific content of the input, or perform display after calculation, or the like. For example, a line input by the user is identified, and then fed back to the event receiving layer for processing. After beautification, it is fed back to the event receiving layer for display. For example, a character input by the user is recognized and then fed back to the event receiving layer for display, or after correction and beautification, it is then fed back to the event receiving layer for display. This is not limited in the example.

Finally, when the first to-be-processed event is processed, the event queue on the Java side may need to be updated. The update process of the event queue may be implemented in the following manner. First, the JVM receives the first processed event sent by the service processing module after processing of the first to-be-processed event, and determines whether the second event type of the first processed event is the third preset type or the fourth preset type. Second, if the second event type is the third preset type or the fourth preset type, the second event subscript value and the event action(s) included in the preset event queue are updated. Then, it is determined whether the updated second event subscript value is greater than a third event subscript value of the processed event. At last, when determining the second event subscript value is greater than the third event subscript value, reassignment is performed on the second event subscript value and the event action(s), and the first to-be-processed event corresponding to the processed event is removed from the event queue.

Figure 11:
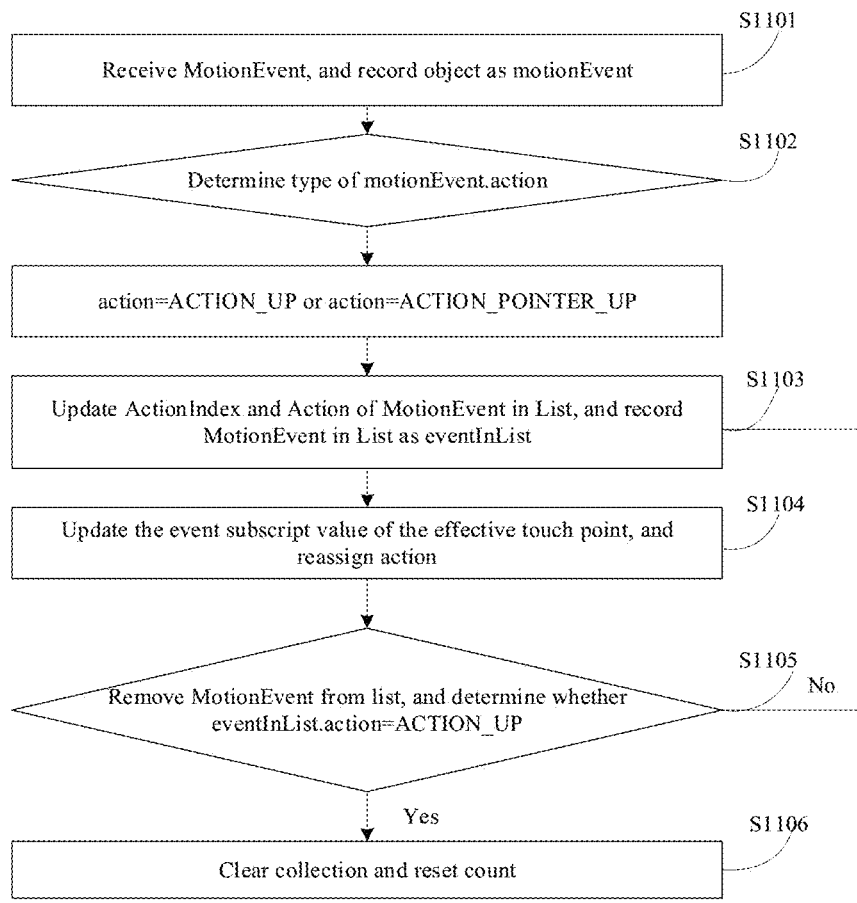
FIG. 11 schematically illustrates a flow chart of a method for updating an event queue according to some exemplary embodiments of this disclosure, FIG. 12 schematically illustrates a flow chart of a touch event processing method based on multi-terminal interaction according to some exemplary embodiments of this disclosure, FIG. 13 schematically illustrates a block diagram of a touch event processing apparatus according to some exemplary embodiments of this disclosure.

Hereinafter, the specific update process of the event queue will be explained and described with reference to FIG. 11. Specifically, as shown in FIG. 11, the update process of the event queue may include the following steps.

In step S1101, MotionEvent is received, and the object is recorded as motionEvent.

In step S1102, the type of MotionEvent.action is determined.

In step S1103, if action=ACTION_UP or action=ACTION_POINTER_UP, motionEvent is an event to remove the touch point from the screen, then ActionIndex and Action of MotionEvent in List are updated, and MotionEvent in List is recorded as eventInList.

In step S1104, if eventInList.actionIndex is greater than motionEvent actionIndex, it means that the event subscript value of the effective touch point on the screen is greater than the removed event subscript value, so the event subscript value of the effective touch point may need to be updated through a formula: eventInList actionIndex=eventInList.actionIndex−1, and reassignment is performed on the action through a formula: eventInList.action=event.actionIndex <<11|eventInList.action.

In step S1105, MotionEvent is removed from the list, and it is determined wheter eventInList.action=ACTION_UP; if yes, it means there are no touch points on the screen, and step S1106 is performed; and if not, step S1104 is repeated.

In step S1106, the collection is cleared and count is reset.

It is to be noted that the specific removal process of the second to-be-processed event and the third to-be-processed event is the same as the specific removal process of the first to-be-processed event, and will not be repeated here.

Figure 12:
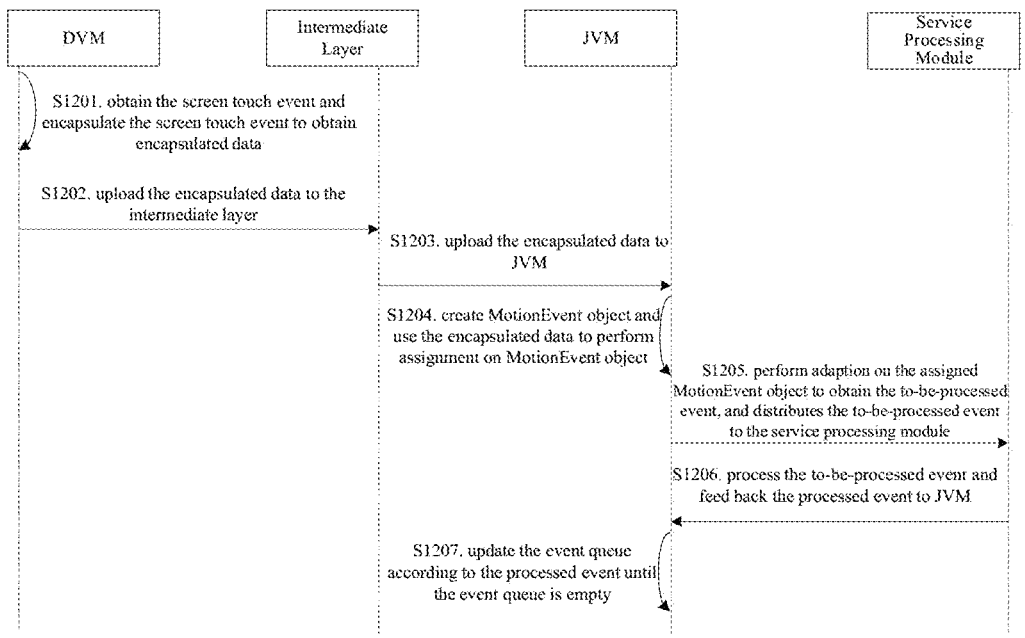

The method for processing touch events according to some exemplary embodiments of this disclosure will be further explained and described below with reference to FIG. 12. Specifically, as shown in FIG. 12, the touch event processing method may include the following steps.

In step S1201, DVM obtains the screen touch event and encapsulates the screen touch event to obtain encapsulated data.

In step S1202, DVM uploads the encapsulated data to the intermediate layer.

In step S1203, the intermediate layer uploads the encapsulated data to JVM.

In step S1204, JVM creates the MotionEvent object and uses the encapsulated data to perform assignment on the MotionEvent object.

In step S1205, JVM performs adaption on the assigned MotionEvent object to obtain the to-be-processed event, and distributes the to-be-processed event to the service processing module.

In step S1206, the service processing module processes the to-be-processed event and feeds back the processed event to JVM.

In step S1207, JVM updates the event queue according to the processed event, and repeats steps S1204 to S1206 until all the to-be-processed events are completed, that is, until the event queue is empty.

Based on the touch event processing method provided by some exemplary embodiments of this disclosure, the problem that the Kirin system does not support multi-touch can be solved. It can also support the sharing of touch events between the Flutter side and the Java side, and realize that, when touch commands are input on the Flutter interface by mouse and finger, the Java side can receive the touch commands and execute the corresponding service logic at the same time.

Figure 13:
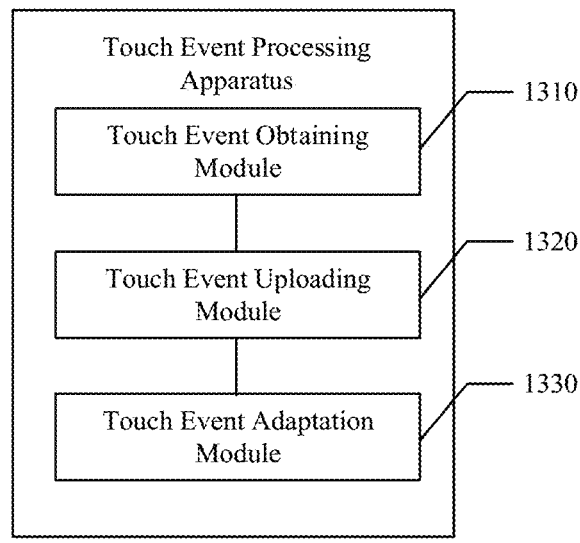

Exemplary embodiments of this disclosure also provide a touch event processing apparatus configured in a display terminal. The display terminal includes an event receiving layer, a JVM, and an intermediate layer for establishing a communication link between the event receiving layer and the JVM. Referring to FIG. 13, the touch event processing apparatus may include a touch event obtaining module 1310, a touch event uploading module 1320, and a touch event adaptation module 1330.

The touch event obtaining module 1310 may be configured to obtain a screen touch event through the event receiving layer.

The touch event uploading module 1320 may be configured to upload the screen touch event to the JVM through the intermediate layer.

The touch event adaptation module 1330 may be configured to derive a to-be-processed event by performing, through the JVM, assignment and adaptation on the screen touch event, and distribute the to-be-processed event to a service processing module for processing.

In some exemplary embodiments of this disclosure, the screen touch event includes at least one of a first touch event input through multiple fingers, a second touch event input through a single finger, and a third touch event input through an external device.

In some exemplary embodiments of this disclosure, when the screen touch event is the first touch event and/or the second touch event, the event receiving layer is a preset touch event processing library; when the screen touch event is the second touch event and/or the third touch event, the event receiving layer is a DVM.

In some exemplary embodiments of this disclosure, the DVM is Flutter UI.

In some exemplary embodiments of this disclosure, the preset touch event processing library is TsLib.

In some exemplary embodiments of this disclosure, when the screen touch event is the first touch event input through multiple fingers, the touch event processing apparatus further includes:

a first event encapsulating module, which may be configured to acquire an event object structure by performing, through the preset touch event processing library, encapsulation on the first touch event.

In some exemplary embodiments of this disclosure, the first event encapsulating module may be further configured to: acquire touch event structure data by performing a first encapsulation on a first event type and a first touch parameter included in the first touch event; and acquire the event object structure by performing a second encapsulation on the touch event structure data.

In some exemplary embodiments of this disclosure, the first event encapsulating module may be further configured to: acquire an event object array by placing, at a first preset time interval, all event object structures within the first preset time interval into a single array; where the touch event upload module 1320 may be further configured to: upload the object array to the JVM through the intermediate layer.

In some exemplary embodiments of this disclosure, the touch event adaptation module 1330 may be further configured to: create a first initial movement event object, traverse each event object structure in the event object array, and acquire a first target movement event object by performing assignment on the first initial movement event object using the first event type and the first touch parameter included in the event object structure; and derive a first to-be-processed event by performing, on the first target movement event object, universal interface adaptation corresponding to the JVM.

In some exemplary embodiments of this disclosure, the touch event adaptation module 1330 may be further configured to: determine whether the first event type of the first target movement event object is a first preset type, where the first preset type refers to touching a screen by a first finger for a first time; acquire, if the first event type is the first preset type, a first valid number of fingers according to a first event subscript value included in the first target movement event object; perform, when determining that the first valid number of fingers is greater than a first preset threshold, reassignment on the first event type based on a preset assignment rule, the first event subscript value and a second preset type, where the second preset type refers to presence of another finger on the screen before a current finger is pressed; and derive the first to-be-processed event by placing the first target movement event object subject to the reassignment in a preset event queue.

In some exemplary embodiments of this disclosure, the touch event adaptation module 1330 may be further configured to: calculate, if the first event type is a third preset type, a second valid number of fingers based on an original number of valid touch points, where the third preset type refers to leaving the screen by one last finger; derive, when determining that the second valid number of fingers is greater than a second preset threshold, the first to-be-processed event by performing reassignment on the first event type based on the preset assignment rule, the first event subscript value and a fourth preset type, where the fourth preset type refers to presence of another finger on the screen before a current finger is lifted.

In some exemplary embodiments of this disclosure, the touch event adaptation module 1330 may be further configured to: derive, if the first event type is not the first preset type and is a fifth preset type, the first to-be-processed event by placing all first target movement event objects whose first event type is the fifth preset type in the preset event queue.

In some exemplary embodiments of this disclosure, the touch event adaptation module 1330 may be further configured to: receive, through the JVM, a first processed event sent after the service processing module completes processing of the first to-be-processed event, and determine whether a second event type of the first processed event is a third preset type or a fourth preset type; update, if the second event type is the third preset type or the fourth preset type, a second event subscript value and an event action included in the preset event queue; determine whether updated second event subscript value is greater than a third event subscript value of the first processed event; and when determining that the updated second event subscript value is greater than the third event subscript value, perform reassignment on the second event subscript value and the event action, and remove the first to-be-processed event corresponding to the first processed event from the preset event queue.

In some exemplary embodiments of this disclosure, when the screen touch event is a second touch event and/or a third touch event, the touch event processing apparatus may further includes:

a second event encapsulating module, which may be configured to acquire second encapsulated data and/or third encapsulated data by invoking a preset encapsulation function to encapsulate the second touch event and/or the third touch event;

where the touch event upload module 1320 may be configured to: upload the second encapsulated data and/or the third encapsulated data to the JVM through the intermediate layer.

In some exemplary embodiments of this disclosure, the touch event adaptation module 1330 may be further configured to: create a second initial movement event object, and acquire a second target movement event object by performing assignment on the second initial movement event object according to a third event type and a second touch parameter included in the second encapsulated data; and derive a second to-be-processed event by performing, on the second target movement event object, universal interface adaptation corresponding to the JVM.

In some exemplary embodiments of this disclosure, the touch event adaptation module 1330 may be further configured to: determine whether the third event type of the second target movement event object is a first preset type; acquire, if the third event type is the first preset type, a third valid number of fingers according to an event ID value included in the second target movement event object; and perform reassignment on the third event type according to the third valid number of fingers, and derive the second to-be-processed event by placing the second target movement event object subject to the reassignment in a preset event queue.

In some exemplary embodiments of this disclosure, the touch event processing apparatus further includes:

a service processing module, which may be configured to process the to-be-processed event through the service processing module.

In some exemplary embodiments of this disclosure, the event processing module may be configured to: determine a gesture type of the to-be-processed event; determine, if the gesture type is a moving gesture, a movement type of the moving gesture, acquire, if the movement type is movement start, a historical drawing time node of a previous drawing event corresponding to a current drawing event included in the to-be-processed event; calculate, if the movement type is moving, a current movement distance of the current drawing event, and determine whether a time difference between a current time node and the historical drawing time node is greater than a second preset time; draw, when determining that the time difference is greater than the second preset time, the current drawing event according to the current movement distance; and update the historical drawing time node according to the current time node; calculate, if the movement type is end of movement, the current movement distance of the current drawing event, and draw the current drawing event according to the current movement distance.

The specific details of each module in the above touch event processing apparatus have been described in detail in the corresponding touch event processing method, which will not be repeated here.

It should be noted that although several modules or units of apparatus for action execution are mentioned in the above detailed description, this division is not mandatory. In fact, according to some embodiments of this disclosure, the features and functions of two or more modules or units described above may be embodied in one module or unit. On the contrary, the features and functions of one module or unit described above can be further divided into multiple modules or units to be embodied.

Furthermore, although various steps of the methods of this disclosure are depicted in the drawings in a specific order, this does not require or imply that the steps must be performed in that specific order, or that all of the illustrated steps must be performed to achieve the desired results. Additionally or alternatively, certain steps may be omitted, multiple steps may be combined into one step for execution, and/or one step may be decomposed into multiple steps for execution.

In some exemplary embodiments of this disclosure, an electronic device capable of implementing the above method is further provided.

Those skilled in the art will understand that various aspects of this disclosure may be implemented as systems, methods, or program products. Therefore, various aspects of this disclosure may be embodied in the following forms, including: a complete hardware implementation, a complete software implementation (including firmware, microcode, etc.), or an implementation combining hardware and software aspects, which may be collectively referred to herein as "circuit", "module" or "system".

An electronic device 1400 according to some embodiments of this disclosure is described below with reference to FIG. 14. The electronic device 1400 shown in FIG. 14 is only an example and should not bring any limitations to the functions and scope of use of the embodiments of this disclosure.

Figure 14:
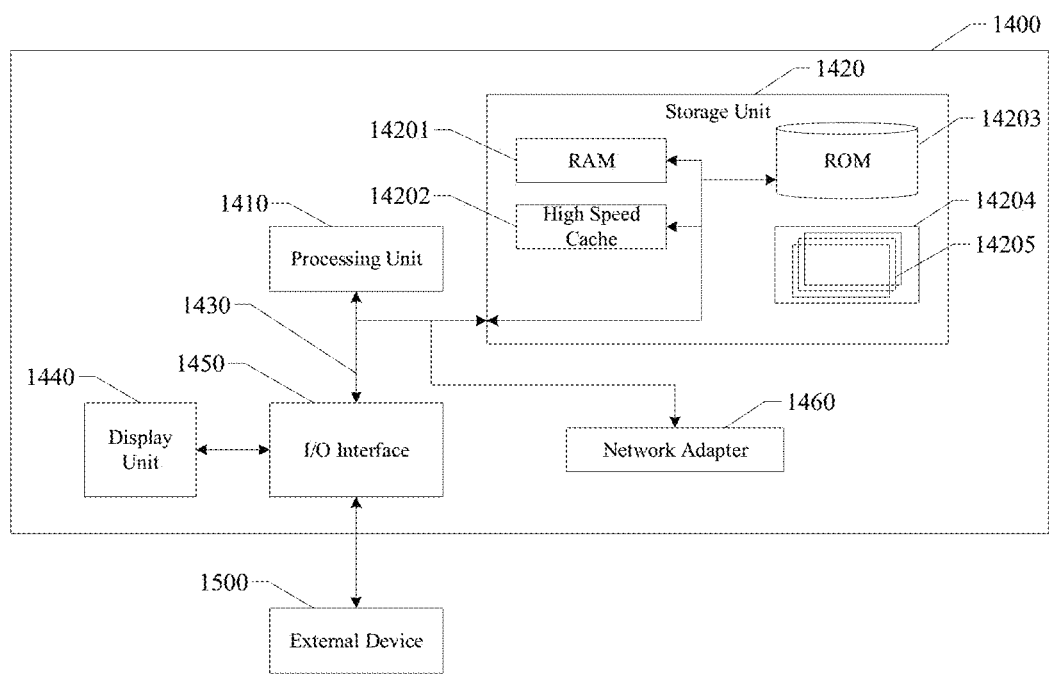
FIG. 14 schematically illustrates an electronic device for implementing the above touch event processing method according to some exemplary embodiments of this disclosure.

As shown in FIG. 14, the electronic device 1400 is embodied in the form of a general computing device. The components of the electronic device 1400 may include, but are not limited to: at least one processing unit 1410, at least one storage unit 1420, a bus 1430 connecting different system components (including the storage unit 1420 and the processing unit 1410), and the display unit 1440.

In some embodiments, the storage unit stores program code, and the program code can be executed by the processing unit 1410, so that the processing unit 1410 performs steps of various exemplary methods according to this disclosure described in the exemplary methods of this specification. For example, the processing unit 1410 can perform steps in FIG. 1, including step S110: obtaining a screen touch event through the event receiving layer; step S120: uploading the screen touch event to the JVM through the intermediate layer; step S130: deriving a to-be-processed event by performing, through the JVM, assignment and adaptation on the screen touch event, and distributing the to-be-processed event to a service processing module for processing.

The storage unit 1420 may include a readable medium in the form of a volatile storage unit, such as a random access memory (RAM) 14201 and/or a cache memory 14202, and may further include a read-only memory (ROM) 14203.

The storage unit 1420 may also include a program/utility 14204 having a set of (at least one) program modules 14205 including, but not limited to: an operating system, one or more application programs, other program modules, and program data. Each of these examples, or some combination thereof, may include the implementation of a network environment.

The bus 1430 may be one or more of several types of bus structures, including a memory bus or memory controller, a peripheral bus, a graphics acceleration port, a processing unit, or a local area bus using any of a variety of bus structures.

The electronic device 1400 may also communicate with one or more external devices 1500 (e.g., keyboard, pointing device, Bluetooth device, etc.), may also communicate with one or more devices that enable a user to interact with the electronic device 1400, and/or may communicate with any device (e g., router, modem, etc.) that enables the electronic device 1400 to communicate with one or more other computing devices. This communication may be achieved through an input/output (I/O)) interface 1450. Furthermore, the electronic device 1400 may also communicate with one or more networks (e.g, a local area network (LAN), a wide area network (WAN), and/or a public network, such as the Internet) through a network adapter 1460. As shown, the network adapter 1460 communicates with other modules of the electronic device 1400 via the bus 1430. It should be understood that, although not shown in the drawings, other hardware and/or software modules may be used in conjunction with the electronic device 1400, including but not limited to: microcode, device drivers, redundant processing units, external disk drive arrays, RAID systems, tape drives, data backup storage system, and the like.

Through the above description of the embodiments, those skilled in the art can easily understand that the exemplary embodiments described here can be implemented by software, or can be implemented by software combined with necessary hardware. Therefore, the technical solution according to the embodiments of this disclosure can be embodied in the form of a software product, which may be stored in a non-volatile storage medium (e.g., a CD-ROM, U disk, mobile hard disk, etc.) or on the network, including several instructions to cause a computing device (e.g., a personal computer, a server, a terminal device, a network device, etc.) to execute a method according to some embodiments of this disclosure.

In some exemplary embodiments of this disclosure, a computer-readable storage medium is also provided, on which a program product capable of implementing the method described above in this specification is stored. In some possible implementations, various aspects of this disclosure can also be implemented in the form of a program product, which includes program code. When the program product is run on a terminal device, the program code is used to cause the terminal device to perform the steps according to various exemplary embodiments of this disclosure described in the above exemplary methods of this specification.

The program product for implementing the above method according to some embodiments of this disclosure may adopt a portable compact disk read-only memory (CD-ROM) and include program code, and may be run on a terminal device, such as a personal computer. However, the program product of this disclosure is not limited thereto. In this disclosure, a readable storage medium may be any tangible medium containing or storing a program that may be used by or in conjunction with an instruction execution system, apparatus, or device.

The program product may take the form of any combination of one or more readable medium. The readable medium may be a readable signal medium or a readable storage medium. The readable storage medium may be, for example, but not limited to, an electrical, magnetic, optical, electromagnetic, infrared, or semiconductor system, apparatus or device, or any combination thereof. More specific examples (non-exhaustive list) of readable storage medium include: electrical connection with one or more conductors, portable disk, hard disk, RAM, ROM, erasable programmable ROM (EPROM or flash memory), optical fiber, portable compact disk ROM (CD-ROM), optical storage device, magnetic storage device, or any suitable combination thereof.

A computer-readable signal medium may include a data signal propagated in baseband or as part of a carrier wave carrying readable program code therein. Such propagated data signals may take many forms, including but not limited to electromagnetic signals, optical signals, or any suitable combination of the above. The readable signal medium may also be any readable medium other than a readable storage medium that can send, propagate, or transport the program for use by or in connection with an instruction execution system, apparatus, or device.

The program code embodied on a readable medium may be transmitted using any suitable medium, including but not limited to wireless, wireline, optical cable, RF, etc., or any suitable combination thereof.

The program code for performing operations of this disclosure may be written in any combination of one or more programming languages, including object-oriented programming languages such as Java, C++, etc., as well as conventional procedural programming language such as C or a similar programming language. The program code may execute entirely on the user's computing device, partly on the user's device, as a stand-alone software package, partly on the user's computing device and partly on a remote computing device, or entirely on the remote computing device or server. In situations involving remote computing devices, the remote computing device may be connected to the user computing device through any kind of network, including LAN or WAN, or may be connected to an external computing device (e.g., Internet connection provided by an Internet service provider).

In addition, the above-mentioned drawings are only schematic illustrations of processes included in the methods according to the exemplary embodiments of this disclosure, and are not intended to be limiting the same. It is readily understood that the processes shown in the above drawings do not indicate or limit the temporal sequence of these processes. In addition, it is also easy to understand that these processes may be, for example, executed synchronously or asynchronously in multiple modules.

Other embodiments of the disclosure will be readily apparent to those skilled in the art from consideration of the specification and practice of the invention herein. This application is intended to cover any variations, uses, or adaptations of the disclosure that follow the general principles of the disclosure and include common knowledge or customary technical means in the technical field not invented by the disclosure. It is intended that the specification and examples be considered as exemplary only, with a true scope and spirit of the disclosure being indicated by the following claims.

What is claimed is:

1. A touch event processing method, configured on a display terminal comprising an event receiving layer, a Java Virtual Machine (JVM), and an intermediate layer for establishing a communication link between the event receiving layer and the JVM, wherein the touch event processing method comprises:
    obtaining a screen touch event through the event receiving layer;
    uploading the screen touch event to the JVM through the intermediate layer; and
    deriving a to-be-processed event by performing, through the JVM, assignment and adaptation on the screen touch event, and distributing the to-be-processed event to a service processing module for processing,
    wherein the screen touch event comprises at least one of a first touch event input through multiple fingers, a second touch event input through a single finger, and a third touch event input through an external device; and
    wherein obtaining the screen touch event comprises:
        in response to the screen touch event being the first touch event, obtaining the screen touch event through a preset touch event processing library; and
        in response to the screen touch event being the second touch event or the third touch event, obtaining the screen touch event through a Dalvik Virtual Machine (DVM).

2. The touch event processing method according to claim 1, wherein the DVM is Flutter UI.

3. The touch event processing method according to claim 1, wherein the preset touch event processing library is TsLib.

4. The touch event processing method according to claim 1, wherein when the screen touch event is the first touch event input through multiple fingers, the touch event processing method, after obtaining the screen touch event, further comprises:
    acquiring an event object structure by performing, through the preset touch event processing library, encapsulation on the first touch event.

5. The touch event processing method according to claim 4, wherein acquiring the event object structure by performing the encapsulation on the first touch event comprises:
    acquiring touch event structure data by performing a first encapsulation on a first event type and a first touch parameter comprised in the first touch event; and
    acquiring the event object structure by performing a second encapsulation on the touch event structure data.

6. The touch event processing method according to claim 5, after acquiring the event object structure, further comprising:
    acquiring an event object array by placing, at a first preset time interval, all event object structures within the first preset time interval into a single array;

wherein, uploading the screen touch event to the JVM through the intermediate layer comprises:
uploading the object array to the JVM through the intermediate layer.

7. The touch event processing method according to claim 6, wherein deriving the to-be-processed event by performing the assignment and adaptation on the screen touch event comprises:
creating a first initial movement event object, traversing each event object structure in the event object array, and acquiring a first target movement event object by performing assignment on the first initial movement event object using the first event type and the first touch parameter comprised in the event object structure; and
deriving a first to-be-processed event by performing, on the first target movement event object, universal interface adaptation corresponding to the JVM.

8. The touch event processing method according to claim 7, wherein deriving the first to-be-processed event by performing, on the first target movement event object, the universal interface adaptation corresponding to the JVM comprises:
determining whether the first event type of the first target movement event object is a first preset type, wherein the first preset type refers to touching a screen by a first finger for a first time;
acquiring, if the first event type is the first preset type, a first valid number of fingers according to a first event subscript value comprised in the first target movement event object;
performing, when determining that the first valid number of fingers is greater than a first preset threshold, reassignment on the first event type based on a preset assignment rule, the first event subscript value and a second preset type, wherein the second preset type refers to presence of another finger on the screen before a current finger is pressed; and
deriving the first to-be-processed event by placing the first target movement event object subject to the reassignment in a preset event queue.

9. The touch event processing method according to claim 8, further comprising:
calculating, if the first event type is a third preset type, a second valid number of fingers based on an original number of valid touch points, wherein the third preset type refers to leaving the screen by one last finger;
deriving, when determining that the second valid number of fingers is greater than a second preset threshold, the first to-be-processed event by performing reassignment on the first event type based on the preset assignment rule, the first event subscript value and a fourth preset type, wherein the fourth preset type refers to presence of another finger on the screen before a current finger is lifted.

10. The touch event processing method according to claim 8, further comprising:
deriving, if the first event type is not the first preset type and is a fifth preset type, the first to-be-processed event by placing all first target movement event objects whose first event type is the fifth preset type in the preset event queue.

11. The touch event processing method according to claim 7, wherein, after distributing the to-be-processed event to the service processing module for processing, the touch event processing method further comprises:
receiving, through the JVM, a first processed event sent after the service processing module completes processing of the first to-be-processed event, and determining whether a second event type of the first processed event is a third preset type or a fourth preset type;
updating, if the second event type is the third preset type or the fourth preset type, a second event subscript value and an event action comprised in the preset event queue;
determining whether updated second event subscript value is greater than a third event subscript value of the first processed event; and
when determining that the updated second event subscript value is greater than the third event subscript value, performing reassignment on the second event subscript value and the event action, and removing the first to-be-processed event corresponding to the first processed event from the preset event queue.

12. The touch event processing method according to claim 1 wherein when the screen touch event is a second touch event and/or a third touch event, after obtaining the screen touch event, the touch event processing method further comprises:
acquiring second encapsulated data and/or third encapsulated data by invoking a preset encapsulation function to encapsulate the second touch event and/or the third touch event;
wherein, uploading the screen touch event to the JVM through the intermediate layer comprises:
uploading the second encapsulated data and/or the third encapsulated data to the JVM through the intermediate layer.

13. The touch event processing method according to claim 12, wherein, deriving the to-be-processed event by performing the assignment and adaptation on the screen touch event comprises:
creating a second initial movement event object, and acquiring a second target movement event object by performing assignment on the second initial movement event object according to a third event type and a second touch parameter comprised in the second encapsulated data; and
deriving a second to-be-processed event by performing, on the second target movement event object, universal interface adaptation corresponding to the JVM.

14. The touch event processing method according to claim 3, wherein deriving the second to-be-processed event by performing, on the second target movement event object, the universal interface adaptation corresponding to the JVM comprises:
determining whether the third event type of the second target movement event object is a first preset type;
acquiring, if the third event type is the first preset type, a third valid number of fingers according to an event ID value comprised in the second target movement event object; and
performing reassignment on the third event type according to the third valid number of fingers, and deriving the second to-be-processed event by placing the second target movement event object subject to the reassignment in a preset event queue.

15. The touch event processing method according to claim 1 further comprising:
processing the to-be-processed event through the service processing module.

16. The touch event processing method according to claim 15, wherein when the screen touch event is the first touch event input through multiple fingers, processing the to-be-processed event comprises:

determining a gesture type of the to-be-processed event;
determining, if the gesture type is a moving gesture, a movement type of the moving gesture;
acquiring, if the movement type is movement start, a historical drawing time node of a previous drawing event corresponding to a current drawing event comprised in the to-be-processed event;
calculating, if the movement type is moving, a current movement distance of the current drawing event, and determining whether a time difference between a current time node and the historical drawing time node is greater than a second preset time; drawing, when determining that the time difference is greater than the second preset time, the current drawing event according to the current movement distance; and updating the historical drawing time node according to the current time node;
calculating, if the movement type is end of movement, the current movement distance of the current drawing event, and drawing the current drawing event according to the current movement distance.

17. A non-transitory computer-readable storage medium for storing a computer program thereon, wherein the computer program is to be executed on a display terminal comprising an event receiving layer, a Java Virtual Machine (JVM), and an intermediate layer for establishing a communication link between the event receiving layer and the JVM, and is configured to, upon being executed by a processor of the display terminal, implement a touch event processing method comprising:
   obtaining a screen touch event through the event receiving layer;
   uploading the screen touch event to the JVM through the intermediate layer; and
   deriving a to-be-processed event by performing, through the JVM, assignment and adaptation on the screen touch event, and distributing the to-be-processed event to a service processing module for processing,
   wherein the screen touch event comprises at least one of a first touch event input through multiple fingers, a second touch event input through a single finger, and a third touch event input through an external device; and
   wherein obtaining the screen touch event comprises:
      in response to the screen touch event being the first touch event, obtaining the screen touch event through a preset touch event processing library; and
      in response to the screen touch event being the second touch event or the third touch event, obtaining the screen touch event through a Dalvik Virtual Machine (DVM).

18. A display terminal, comprising an event receiving layer, a Java Virtual Machine (JVM), and an intermediate layer for establishing a communication link between the event receiving layer and the JVM, and further comprising:
   a processor; and
   a memory for storing executable instructions of the processor;
   wherein, the processor is configured to, through executing the executable instructions, implement a touch event processing method comprising:
   obtaining a screen touch event through the event receiving layer;
   uploading the screen touch event to the JVM through the intermediate layer; and
   deriving a to-be-processed event by performing, through the JVM, assignment and adaptation on the screen touch event, and distributing the to-be-processed event to a service processing module for processing,
   wherein the screen touch event comprises at least one of a first touch event input through multiple fingers, a second touch event input through a single finger, and a third touch event input through an external device; and
   wherein obtaining the screen touch event comprises:
      in response to the screen touch event being the first touch event, obtaining the screen touch event through a preset touch event processing library; and
      in response to the screen touch event being the second touch event or the third touch event, obtaining the screen touch event through a Dalvik Virtual Machine (DVM).

* * * * *